Figure 1:
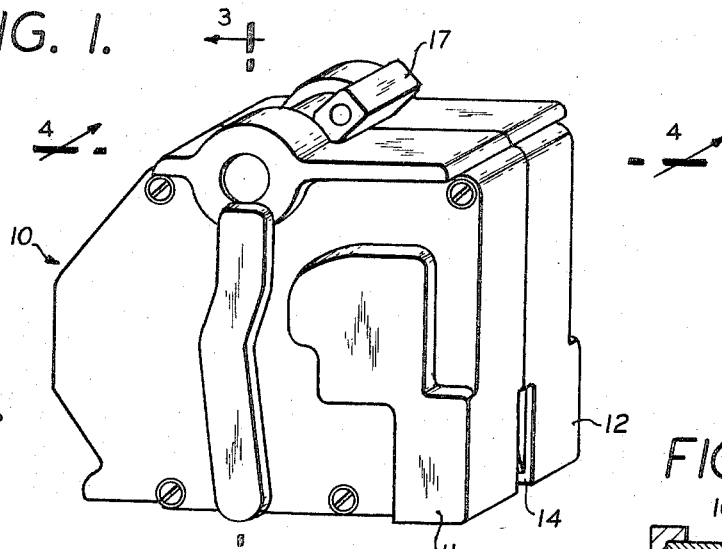

Aug. 22, 1967 A. B. RYPINSKI 3,337,824
CIRCUIT BREAKER HAVING DASHPOT TYPE ELECTRO-MAGNETIC
CORE AND SIMPLIFIED ACTUATING LINKAGE
Filed Dec. 9, 1963 4 Sheets-Sheet 1

INVENTOR
ALBERT B. RYPINSKI
BY
ATTORNEY.

INVENTOR
ALBERT B. RYPINSKI
BY

ATTORNEY.

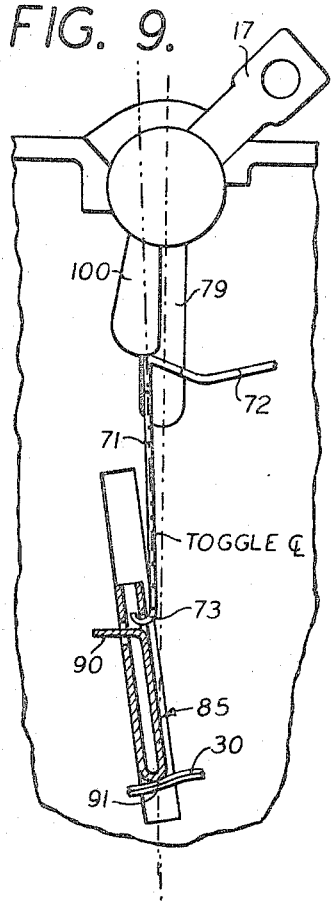
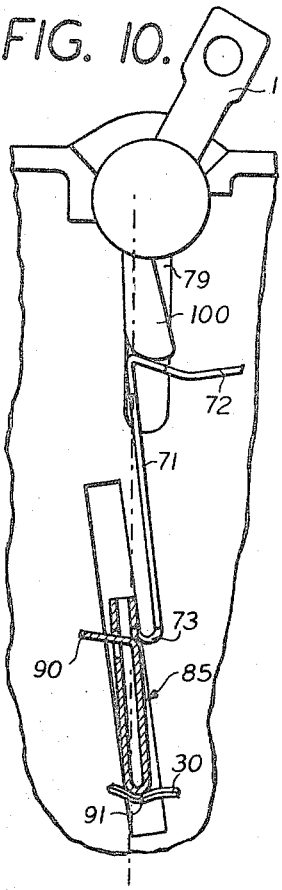
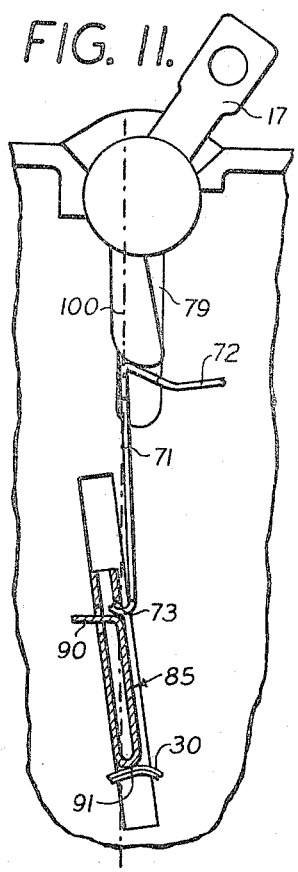
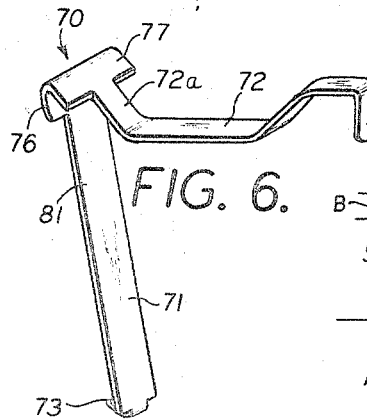
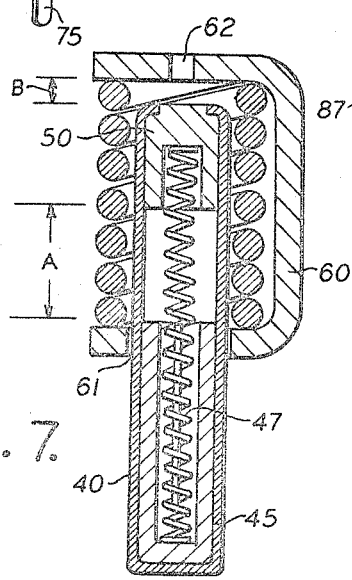
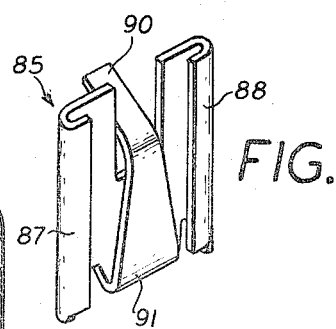

INVENTOR
ALBERT B. RYPINSKI
BY
ATTORNEY.

United States Patent Office 3,337,824
Patented Aug. 22, 1967

3,337,824
CIRCUIT BREAKER HAVING DASHPOT TYPE ELECTRO-MAGNETIC CORE AND SIMPLIFIED ACTUATING LINKAGE
Albert B. Rypinski, 233 E. 69th St., New York, N.Y. 10021
Filed Dec. 9, 1963, Ser. No. 328,899
17 Claims. (Cl. 335—38)

This invention relates to the art of electrical circuit breakers, more particularly to devices permitting either selective manual circuit interruption, or serving to automatically interrupt current flow upon the occurrence of undesired load conditions which would result in damaging or otherwise dangerous conditions in an electrical circuit.

In any electrical circuit, it is desirable to provide some means interrupting the flow of electrical current through the circuit upon the occurrence of undesired conditions. To this end a variety of devices have been evolved serving to interrupt or "break" the circuit upon the occurrence of this undesired condition. Fuses containing a relatively low melting point alloy (compared to the current carrying conductors of the circuit) have in the past been arranged in the circuit so as to melt and interrupt current flow through the circuit upon the occurrence of an undesired current condition. This has necessitated replacement of complete fuse elements, requiring the stocking of fuses, and the rather involved manual manipulation required in order to effect replacement of the fuse. These fuses have given way to circuit breakers of either a thermal type, in which a thermal element upon being heated by an overload condition serves to interrupt current flow through the circuit, or a magnetic type in which an electro-magnetic element serves to effect switching to interrupt current flow through the circuit. Re-setting of the "tripped" breaker is accomplished by a manually controlled switch handle which in addition to providing facile resetting of the breaker upon tripping, also permits interruption of the circuit by manual displacement of the switch arm to a tripped position.

Among the requirements of a circuit breaker is the desirability that the breaker carry its full load continuously when the circuit is made, but must begin to trip at low overloads; and it must have inverse time delay tripping characteristics conforming to accepted curves. On short circuit, tripping should be as nearly instantaneous as is practicable.

On transient overloads of short duration, such as during heat up of tungsten filament lamps, or motor start up, the breaker must not trip.

The time delay mechanisms employed in circuit breakers are of three general types: fully magnetic; thermal with magnetic assist; and fully thermal. Broadly speaking, this application is directed to fully magnetic circuit breakers, but certain elements herein may adapt themselves to breakers employing any type of time delay mechanisms.

Magnetic circuit breakers of the types shown in U.S. Patent 2,890,306 have been developed which are commercially feasible in production and maintenance. Among the problems arising in producing a commercially feasible circuit breaker is the need to provide a switch linkage exerting sufficient force on the breaker contacts to insure a good connection therebetween, when the circuit is made, with little contact resistance and low temperature. Additionally, the link train must be adapted to be tripped by the application of relatively small tripping forces. Such linkage should be subject to being produced and assembled at relatively little cost and occupying a relatively little volume so as to permit installation of the assembled components in any area. As indicated in the aforementioned patent, toggle linkages are generally employed in magnetic circuit breakers. These conventional toggle mechanisms are however subject to some difficulties in that they are rather costly in assembly due to the precision with which their pivot points must be maintained, and the precision with which the trip mechanism components must be positioned to prevent inadvertent tripping, while insuring tripping under overload conditions.

In order to reduce production cost, it is desirable to minimize the number of windings of wire required to establish a magnetic field sufficient to produce tripping of the switch actuating linkage. At the same time it is necessary to provide sufficient inertia in the system so that normal start up loads which are considerably higher than operating loads will not produce tripping of the circuit breaker.

It is with these problems and desiderata in mind, that the present means have been evolved, means permitting provision of a magnetic circuit breaker readily capable of accommodating high starting loads without tripping, and on the other hand producing necessary tripping forces under undesired circuit load conditions with a minimal number of ampere turns in the solenoid coil. A novel toggle arrangement has been provided serving to permit the utilization of the desirable advantages of a toggle linkage to effect coupling of the solenoid to the switch arms and an improved armature has been provided to exert a direct force on the switch actuating linkage, with the positioning of the toggle and armature not requiring great precision to obtain desired operation.

It is accordingly among the primary objects of this invention to provide an improved magnetic circuit breaker in which a toggle linkage is provided to respond with what amounts to a delayed action to undesired overload conditions in the circuit in connection with which the breaker is employed, thereby permitting the accommodation of temporarily high loads, without circuit interruption.

A further object of the invention is to provide means minimizing the ampere turns required in a solenoid of a magnetic circuit breaker to effect desired circuit tripping.

Another object of the invention is to reduce the precision with which the components of a magnetic circuit breaker must be produced and assembled to obtain desired operation, thereby increasing the permissible range of production tolerance, and minimizing cost.

A further object of the invention is to improve the efficiency with which forces are transmitted between the tripping components of a circuit breaker under conditions when tripping is desired, while reducing the efficiency of force transmission under momentary overload conditions, thereby reducing necessary magnetic forces, and precision of component positioning.

It is also an object of the invention to provide a switch link train in a magnetic circuit breaker, with components so arranged as to permit a relatively wide latitude of permissible spacing therebetween, thus minimizing the required accuracy of assembly and resulting cost, and preventing the accumulation of foreign matter between the components to interfere with desired operation.

These and other objects of the invention which will become hereafter apparent are achieved by providing a novel magnetic circuit breaker construction in which the breaker components are enclosed within a plastic non-conducting housing of a rectangular configuration adapted for installation in a conventional load center panel. The casing is formed in two halves designed for conjunction by means of conventional fastening members such as screws, rivets or the like. Housed within the casing is a contact electrically coupled to a screw type wire connector. This contact is one contact of a switch which includes a movable switch arm of spring material having a contact mating with said first mentioned contact at one end thereof and coupled at its other end to a solenoid coil which is in turn electrically connected to a circuit breaker terminal in the form of a switch blade receiving clip adapted for engagement with a conventional clip of a panel board. An armature in the form of a hollow tube of nonmagnetic material is movably mounted within the solenoid coil. Within this tube a magnetic core piece is movably mounted along with a plug of magnetic material. The armature tube is filled with a viscous fluid, and a spring is arranged between the plug and the core so that the fluid and the spring tend to resist the movement of the core towards the plug under the action of a magnetic field produced by the solenoid coil. A lever link is provided in the form of a bell crank lever having a resilient arm arranged in the path of movement of said armature tube, and having its other arm relatively rigid and exerting a biasing force to bring the movable contact against the stationary contact. The lever is formed with a fulcrum which is slidable in said housing. An operating member in the form of a handle having a cam surface riding over said resilient arm of the lever link acts to bias the lever link to exert a contact closing force. A foot on the rigid arm of the lever link engages a slide member slidably and rockably mounted in a slideway in said housing and engaging said movable switch arm when said lever link is acted on by said operating handle, so that said lever link and said slide member act as a toggle with the position of the point of contact between the arm of the lever link and the slide member determining whether the circuit is tripped or not. Depending on the position of the operating member, and the magnetic force generated by the solenoid coil the circuit in connection with which the circuit breaker is employed will be either made or broken.

The overload sensing means here presented is of the electro-magnetic type and produces sufficient power so that no leverage multiplication is necessary to effect contact separation. The accuracy requirement of the link train components is reduced, and an elementary linkage, even with variably increased friction, becomes practicable.

One means to increase tripping power is to utilize the total magnetism inside the coil winding. Previous designs, such as that in U.S. Patent 2,890,306, have utilized only a portion of the magnetism at the end of the coil winding.

In this application an armature is provided for movement inside the helical coil under the full power of all the lines of force inside the coil.

A second means here presented to increase transmission of tripping force resides in the use of considerably enlarged armature cores. In previous designs if the core and/or the coil turns were increased sufficiently to provide a substantially increased pull, the breaker would trip on transient overloads.

In the construction herein the armature is formed by two cores (or a plug and core) inside a movable container or tube arranged within the coil winding, one core on each side of the longitudinal coil center. On transient overloads the cores tend to move in opposite directions, and the net pull, transmitted to the container and to the trip means, is insufficient to trip the breaker. On sustained overloads the core and plug come together and combine their pulls, resulting in ample tripping force.

The larger cores, even with reduced ampere turns in the coil, permit a one to one leverage ratio from coil to trip point, with no necessity for high accuracy since the movement at the trip point is relatively large.

With ample tripping force available, the friction in the link train can vary greatly and still respond properly to the available tripping power. This eliminates the necessity for tight tolerance control of the link train measurements, and reduces costs.

A third means of increasing the transfer of tripping force to the trip point is attained by insuring that the full force which the movement of the armature cores can produce is delivered at the trip point, independently of the resistance to tripping.

A resilient spring portion is provided as part of the tripping lever. The spring portion allows the magnetic elements at the coil to completely close their air gaps and exert their maximum pull, even if the link train fails to trip.

In previous designs with rigid trip levers, resistance can stop the lever with a partly closed air gap and less than maximum pull, and cause failure to trip.

A fourth means of increasing tripping force transmission consists in reducing the air gaps in the magnetic circuit to a minimum. In previous designs the external magnetic circuit has one or more air gaps in addition to gaps internal to the coil. In the present application a one piece U-shaped frame forms the external magnetic circuit. There are three air gaps internal to the coil, two of which close as the breaker functions, leaving only one small air gap at full power.

A novel means is provided herein to reduce the cost of the magnetic system. Ordinarily an insulating spool or its equivalent is provided on which the coil is wound, and various screws, or the like, are necessary to support the magnetic circuit.

Panelboard magnetic breakers are of varying ampere capacity, and the wire size and turns vary accordingly. In the disclosure herein these various coils are wound with a uniform outside diameter, and consequently a varying inside diameter. This permits differently sized coils to be supported by the same support spacing molded into a single size of split insulating case.

The movable armature container or tube for the magnetic cores is slidably supported by appropriate knife edge bearings along its length, the knife edge projections formed in the two halves of the case.

These constructions reduce the costs of material to a minium, and render assembly simple and inexpensive.

In any circuit breaker there must be a handle for manual operation and an arm or strip to form a switch, for making and breaking the circuit.

In the construction herein there are only two thin metal stampings and one spring in the link train, in addition to the handle and contact arm. Due to the power considerations previously mentioned these only need grooves in the two halves of the case for their support and guidance. There are no pivots nor high accuracy parts. Assembly is elementary, and one part, a bell crank lever, performs a number of functions.

These simple parts together form a link train with two overcenter-undercenter toggles, one adapted to be automatically tripped.

The link train is adapted to utilize both rolling and sliding motion in allowing one part to escape from another, in tripping. Both of the two trippable parts can rock from side to side. In doing so they pass from undercenter to overcenter or vice versa. As they pass through dead center the force required to move them (disregarding friction) is zero, regardless of how tightly they are being pressed together. This is so because on one side of center the force required to move them is in one direction, whereas on the other side it is in the reverse direction.

It follows that, if the toggle is overcenter, and stable because of the spring pressure holding it against one side of its groove, that a pull on one member can either slide that member over the other, towards dead center, or rock the other member as far as its groove will permit. Since sliding friction under these conditions is greater than rolling friction, the parts will rock. If they rock past center the escaping piece may be traveling downhill, whereas when overcenter it might have to travel uphill to escape. In addition, when undercenter, the spring pressure assists the escape, whereas before it was opposed. Rocking action therefore facilitates tripping.

Adjustable tongues are provided where the two tripping members meet. Adjusting these tongues shifts the touching point with regard to the centerline.

The handle employed as an operating member in this application acts to hold the link train against accidental collapse until the contacts close, at which point the system becomes sensitive to tripping. At and beyond this point the breaker is trippable by overload or short circuit, regardless of whether the handle is held or not. It is "trip free of the handle," as required by Underwriters' Laboratories, Inc.

Ordinarily a spring is required to return the handle to OFF position, after the contacts open. In this application an alternative structure is disclosed whereby the tripped element moves and strikes the handle in such a way as to carry it overcenter, after which it is moved to OFF position by means other than a handle spring.

A feature of the invention resides in the provision of a movable armature tube provided with a plug and a core piece which during an initial period of solenoid coil energization act in opposition to each other, and in a second period of solenoid coil energization act in concert with each other to effect armature tube movement to produce direct tripping action on the switch lever linkage.

Another feature of the invention resides in the formation of a lever link shaped as a bell crank lever with one end adapted to exert a trippable biasing force on a movable switch contact to bring same into circuit making relationship with respect to a stationary contact, and the other end of the lever link formed with a resilient arm yieldably contacted by a moving armature so that the tripping forces transmitted to the lever link build up as the armature moves toward the resilient arm.

It is also a feature of the invention that no pivot bearings need be provided but merely slot-like slideways formed in the housing thus eliminating the precise and costly machining requirements necessitated when pivot points must be provided for.

A further feature of the invention resides in the mounting of the slide member for rocking motion to eliminate sliding friction to effect tripping.

Another features resides in the utilization of substantially all of the magnetism present in the interior of a solenoid to produce the maximum tripping force the coil can exert.

A further feature resides in the resilient means in the link train, allowing the magnetic force producing means to exert any value, required to trip up to its full pressure.

Another feature resides in the magnetic system with a minimum of air gaps at maximum magnetic pressure.

A further feature resides in the single insulating case having separate and independent means for supporting any one of a series of differently rated coils and their common external magnet circuit, out of contact with and insulated from, each other. As another feature the knife edge guideways are provided for the sliding container or tube carrying the armature cores for the coil, the guideways holding this container out of contact with and insulated from the coil and its external magnetic circuit.

Another feature resides in the link train wherein the ratio of movement of the tip means is substantially 1 to 1 from the coil to the trip point.

Figure 2:
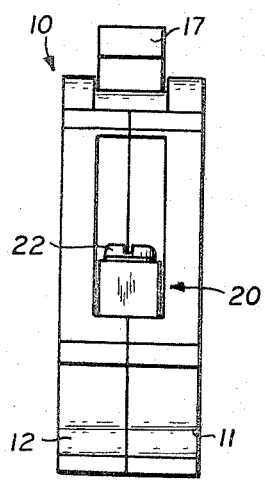
Figure 17:
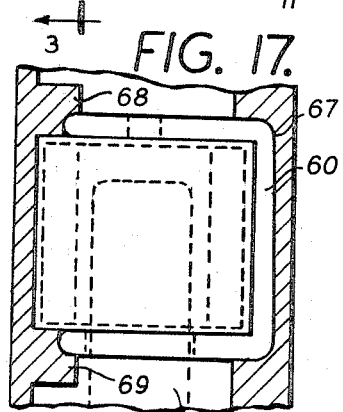
Figure 3:
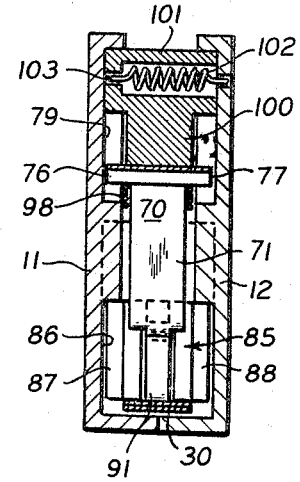
Figure 12:
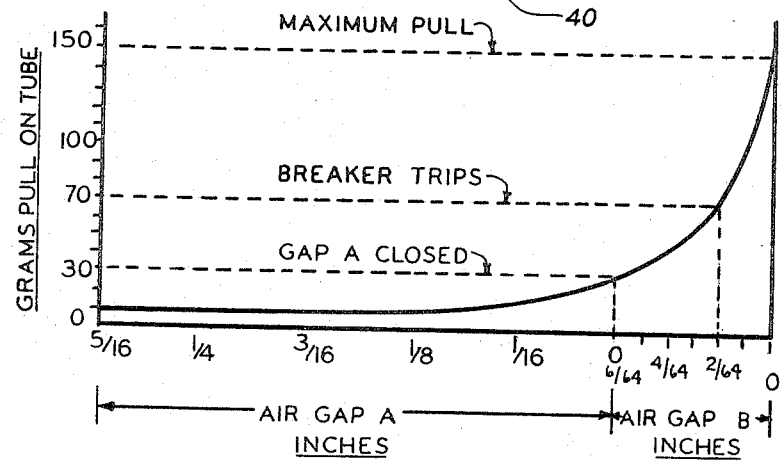
Figure 5:
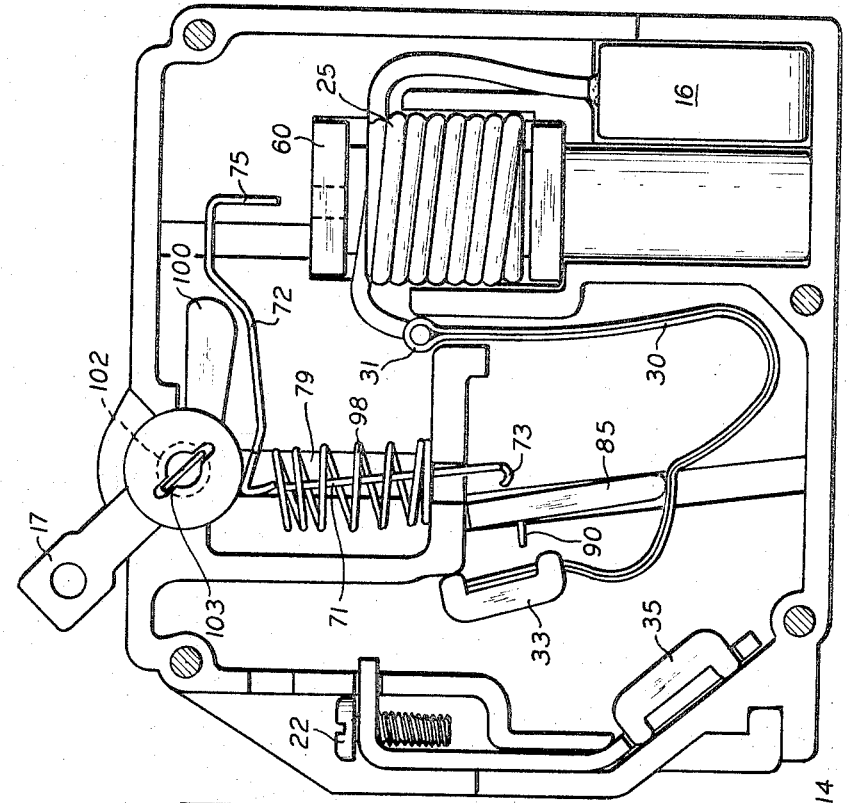
Figure 4:
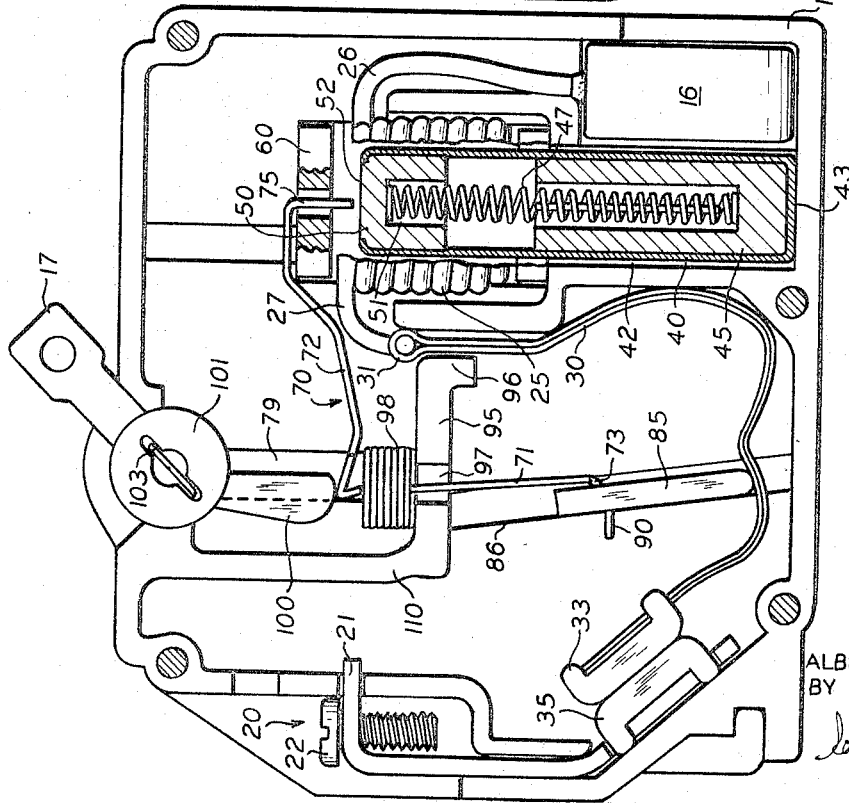
Figure 13:
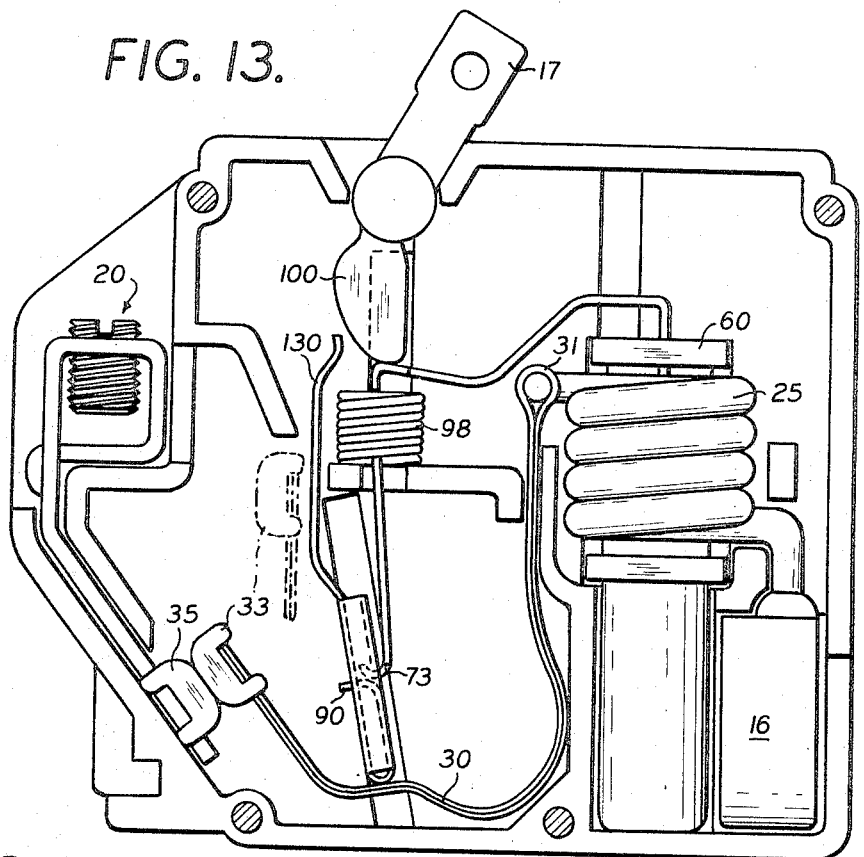
Figures 14, 18:
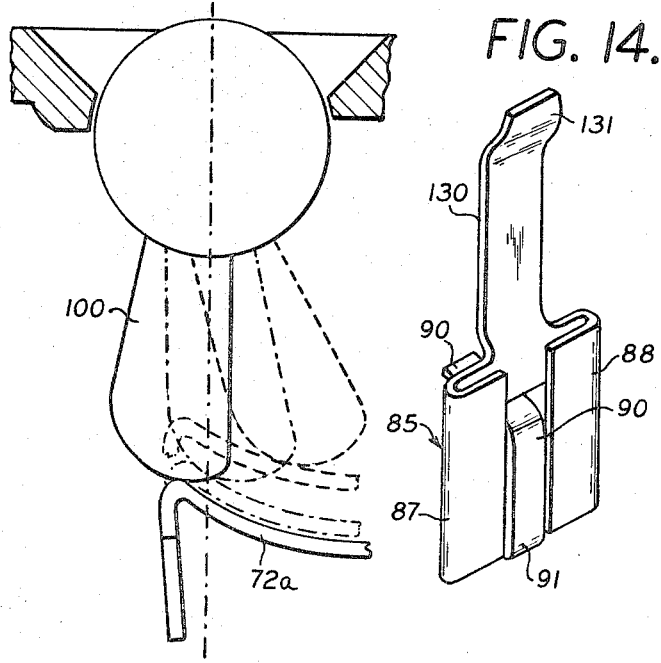
Figure 15:
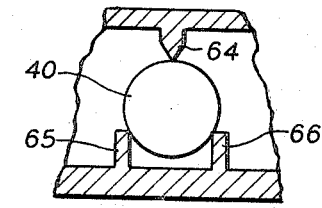
Figure 16:
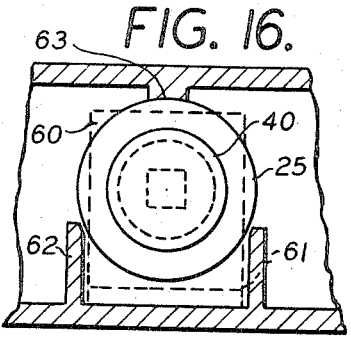

The specific details of the invention, and their mode of functioning, will be made most manifest and particularly pointed out in clear, concise, and exact terms in conjunction with the accompanying drawings wherein:

FIG. 1 is a perspective side elevational view of a circuit breaker made in accordance with the teachings of this invention; and FIG. 2 is an end elevational view looking at the remote end of the circuit breaker shown in FIG. 1 showing the wire connector; and FIG. 3 is a cross sectional view taken on line 3—3 of the circuit breaker of FIG. 1 showing the interior casing contours and slots defining the slideway; and FIG. 4 is an enlarged cross sectional view taken on line 4—4 of FIG. 1; and FIG. 5 is an enlarged cross sectional view similar to FIG. 4 showing the circuit breaker with its components oriented in a position breaking the circuit in conjunction with which it is employed; and FIG. 6 is an enlarged detail view of the lever link; and FIG. 7 is an enlarged detail view of a cross section taken through the solenoid armature assembly on a plane transverse to the plane of FIGS. 4 and 5 showing the components oriented in a non-trip position; and FIG. 8 is an enlarged detail view of the slide member; and FIG. 9 is an enlarged detail view showing the toggle action of the operating handle, the lever link, and the slide member with the components oriented in a locked circuit making condition; and FIG. 10 is an enlarged view similar to FIG. 9 showing the switch actuating components oriented in a position immediately prior to tripping; and FIG. 11 is an enlarged view similar to FIGS. 9 and 10 showing the switch actuating components at a point of maximum sensitivity between a tripped and locked position; and FIG. 12 is a graphical presentation of the desired characteristic curve of the solenoid coil and armature assembly in which the pull on the armature tube is plotted in grams along the ordinate against the air gap between the magnetically responsive components in inches; and FIG. 13 is an alternative construction of a circuit breaker like that in FIGS. 4 and 5, and in which the handle spring has been replaced by means eliminating the need for the handle spring; and FIG. 14 is an enlarged detail of the slide member formed with a handle pusher arm to eliminate need for a handle spring; and FIG. 15 is a detail view of the knife edge guide for the tubular armature casing; and FIG. 16 is a detail of the supports for the coil; and FIG. 17 is a detail view of the mounting for the magnetic frame in the case; and FIG. 18 is an enlarged schematic view of the cam action of the handle and its cooperating lever link.

Referring now more particularly to the drawings, like numerals in the various figures will be employed to designate like parts.

As best seen in FIG. 1 the novel circuit breaker 10 is shown as arranged within a casing or housing formed of a suitable non-conducting material subject to ready molding whether organic or inorganic, such as phenol formaldehyde resins, glass bonded mica, polystyrene, and the like. Thermosetting plastics such as urea are found particularly suitable. The housing or casing is preferably formed in two symmetrical halves 11 and 12. One end of the casing is formed to leave an opening 14 through which access may be had to a spring clip connector 16 as best seen in FIGS. 4 and 5. Clip connector 16 is of the conventional type adapted to engage the blade of a bus bar of the load center panel. On the end of the casing opposite to the one in which slot 14 is formed a wire connector 20 is provided. Wire connector 20 comprises a plate member 21 formed of conducting material such as copper or the like through which headed screw 22 is threadedly inserted, as best seen in FIGS. 2, 4 and 5.

*Electrical circuit*

Arranged within the casing, to form a circuit between wire connector 20 and spring clip connector 16 are a plurality of current carrying components.

Solenoid coil 25 is coupled by a conductor 26 extending from one end of the coil to spring clip connector 16, as best seen in FIGS. 4 and 5. The other end of solenoid coil 25 is connected by a conductor 27 to a fixed end of movable contact spring 30. Contact spring 30 in the illustrated embodiment of the invention is formed of a strip of resilient, conducting material such as spring copper or spring bronze folded over on itself and soldered at return bend 31 to the free end of conductor 27 which is arranged within the return bend 31. Movable contact 33 is secured to the free end of contact spring 30 so that it may be moved as a result of movement of spring 30 to and from circuit making relationship with respect to fixed contact 35, which as seen in FIGS. 4 and 5 is secured on plate member 21. Plate member 21 as above described is formed of copper, or the like electrically conducting material, and is anchored by engaging the ends thereof as illustrated within the casing.

Thus when movable contact 33 touches fixed contact 35 an electrical circuit is completed through spring clip connector 16, conductor 26, solenoid coil 25, conductor 27, contact spring 30, movable contact 33, fixed contact 35 and plate 21 of wire connector 20.

*Magnetic system*

Arranged within solenoid coil 25, as best seen in FIGS. 3, 4 and 7, is an armature tube 40 movably mounted within a slidaway formed in the casing, as hereinafter described. Armature tube 40 is made of a non-magnetic material such as aluminum or the like, is formed with a closed lower end 43, and an upper end which is adapted to be spun or otherwise closed to provide a liquid tight seal for the tube.

Core piece 45 of a cylindrical configuration is slidably mounted within the interior of tube 40 and dimensioned to allow liquid such as oil to pass between its exterior wall and the interior wall of cylindrical tube 40. Core piece 45 is preferably formed with a hollow bore 46 within which the lower end of a coil compression spring 47 is received. The core piece 45 is slotted to reduce eddy currents when the coil 25 is energized, and to prevent air being trapped in bore 46 when the tube is filled with liquid.

At the upper end of armature tube 40, as viewed in the drawings, a plug of magnetic material such as iron or preferably a soft magnetic stainless steel is arranged. In the illustrated embodiment of the invention, plug 50 is fixedly secured at the top of the armature tube 40 and acts as a closure for the tube. It will, however, be apparent to those skilled in the art that a variety of different types of closures may be employed, and that the plug 50 need not be secured with respect to the armature tube 40 and may be arranged to move slidably therewithin. In the illustrated preferred embodiment, where the plug 50 is employed as a tube closure, the plug is formed with a bore the lower end of which is of a diameter to accommodate compression spring 47.

The upper end of plug 50 is preferably shaped as shown in FIGS. 4 and 7 so that when the end of tube 40 is spun over to seal the contents in, the upper end 52 of the plug will remain exposed, with the spun over aluminum flush with the front face. This insures complete closure of the air gap at this point, and maximum pull.

Assembly of the armature tube 40, core 45, and spring 47 is preferably accomplished by inserting the core 45 into the open end of tube 40 along with spring 47. Oil or other liquid is then added. The plug 50 is inserted until it reaches a small shoulder inside the tube (not shown). The plug is a neat or press fit in the tube and forms a partial seal. The projecting end of the tube is then spun over to complete the hermetic seal, the plug serving as an anvil in the spinning.

A U-shaped frame 60 of magnetic material such as iron or the like is supported within the housing to straddle solenoid coil 25, as best seen in FIGS. 3, 4 and 7. The lower leg of frame 60 is formed with a circular aperture 61 through which armature tube 40 may freely slide. The upper leg of frame 60 is formed with an aperture through which a prong of a lever link (as hereinafter described) may extend into contact with the upper end of armature tube 40 as will be made more apparent.

It is thus seen that a magnetic system has been provided in which the flow of current through solenoid coil 25 generates a magnetic field which influences core 45, plug 50, and frame 60 of magnetic material. The mode of operation of these magnetically responsive components will be hereinafter made more apparent.

The method of mounting coil 25, tube 40, and frame 60 in the two halves of the case is shown schematically in FIGS. 15, 16 and 17.

Panelboard circuit breakers are of various ampere capacities within the same size case.

In order to obtain certain advantages, to be described, the coil 25, representing a number of ampere capacities, is produced with the same outside diameter, but with varying inside diameters, for all these capacities.

With this uniform outside diameter the case can be provided with uniform supports, as shown schematically in FIG. 16, where three projections 61, 62 and 63, serve to locate and hold the coil 25 in position regardless of its ampere capacity. Its inside diameter is large enough so that in no case does tube 40 touch or bear on it.

Tube 40 is outside the coil and the frame for a considerable portion of its length, as shown in FIGS. 4, 5 and 7. In this portion three guiding ribs 64, 65 and 66 as shown in FIG. 15, project from the two parts of the case, and, preferably, form knife edge bearings of insulating non-metallic material. The tube 40 is therefore free to move its limited travel on these knife edge bearings, not subject to corrosion, electrolytic action, or any other retarding influence.

The frame 60 is likewise supported in the case as shown schematically in FIG. 17. Its base rests in a cavity 67 in the case and its two arms are held down by portions 68 and 69 of the case. Where the tube 40 passes through one wall of the frame 60 the opening is sufficiently large so that, preferably, there is no contact between the metallic surfaces, hence no chance of electrolytic or other corrosion.

With the construction described it is apparent that the three elements, coil 25, tube 40 and frame 60 are supported in operating condition by the two parts of the case. This construction facilitates production by permitting assembly by simply dropping the parts into one case half, and using the other case half as a cover.

*Switch actuating linkage*

Movement of contacts 33 and 35 into and out of circuit making relationship is accomplished either automatically in response to the magnetic field generated by the solenoid coil 25, or selectively in response to the positioning of manually movable handle 17 by the use of an improved switch linkage. The switch linkage comprises a lever link 70 as best seen in FIGS. 4, 5 and 6, in the shape of a bell crank lever having a relatively rigid vertically extending leg 71 as viewed in the drawings, and a resilient leg 72. Leg 71 has a laterally extending foot 73 formed at the lower end thereof, and resilient leg 72 has a prong 75 formed at the free end thereof. The resilience of leg 72 is preferably obtained by reducing the material cross-section thereof as best seen in FIG. 6. The leg 72 is contoured as shown to provide a slope 72a adjacent its fulcrum.

The lever link 70 is pivotally and slidably mounted in the casing by extending wings or flanges 76 and 77 on opposite sides of arms 71 and 72 at the point of transition therebetween. Flanges 76 and 77 define a sliding fulcrum for the lever 70. The wings or flanges 76 and 77 are arranged for sliding in pivotal movement in fulcrum slideways 79 formed by slots on opposite sides of the casing to accommodate the flanges. With fulcrum flanges 76 and 77 arranged in fulcrum slideways 79, the lever link 70 will be mounted as seen in FIGS. 4 and 5, with prong 75 on the end of resilient arm 72 subject to extending through the aperture in the upper arm of magnetic frame 60, while leg 71 extends downwardly towards contact spring 30.

It is preferred that the resilient leg 72 be formed integral with leg 71 of a single stamping of the same material, preferably tempered non-magnetic stainless steel. This is accomplished by making the leg 72 narrow to reduce the material cross section thereof, whereby as will be understood by those skilled in the art, its flexibility as compared to leg 71 will be increased.

Slide member 85 as best seen in FIGS. 4, 5 and 8 is arranged for sliding in slideways 86, formed on opposite sides of the casing, there being a slideway 86 in each symmetrical half of the casing, as will be apparent to those skilled in the art. Slideways 86 are of a depth such as to permit free sliding movement of the slide member 85 within the slideway, along with a slight rocking action for a purpose to be made hereinafter more apparent. Slideways 86 are of a length such as to permit movement of the slide member 85 between a position forcing movable contact 33 into engagement with fixed contact 35 as seen in FIG. 4 to a position in which the movable contact 33 will be remote from fixed contact 35 as seen in FIG. 5. Slide member 85 is preferably formed of thin non-magnetic stainless sheet steel and has its edges folded over to form bearing surfaces 87 and 88 on opposite edges thereof as viewed in FIG. 8, which bearing surfaces are adapted to ride in slideways 86. A tongue 90 is bent up from the lower end of the slide member 85, with the point of bending defining a rocking bearing 91 providing substantial line-contact between the slide member and movable contact spring 30. The upper end of tongue 90 as viewed in the drawing is angled with respect to the slide member 85 and is adapted for contact by foot 73 of lever link 70.

Casing partition wall 95 has a slot 96 in which contact spring 30 is anchored. An opening 97 in partition wall 95 permits the free movement of lever link 70 as viewed in FIGS. 4 and 5. The depth of this opening is just sufficient, in the two halves of the casing, to permit free movement of lever link 70. It therefore acts to centralize the link in the case and provide a four sided bearing for the end of spring 98. A pair of pads are provided for the resilient end 72 of lever link 70, so that it also is maintained central to the longitudinal plane of the case. Compression spring 98 is arranged around leg 71 of lever link 70 with the lower end of spring 98 bearing against partition wall 95 and the upper end of compression spring 98 bearing against fulcrum flanges 76, and exerting an upward bias on the lever link. Leg 71 of lever link 70 provides a guide and bearing for spring 98. Spring 98 has a sliding fit on leg 71, so that the thin metal prevents it from moving sideways and touching fulcrum flange 77. Thus it can only exert a vertical bias on leg 71, and serve its single purpose of lifting lever link 70.

In order to effect movement of the switch linkage components, a cam foot 100 is formed integral with handle 17 on a side opposed to the handle with respect to a handle journal 101. Journal 101 is pivotally mounted in bearings formed in the casing so that upon movement of handle 17 from one side to the other, cam foot 100 will ride over the resilient leg 72 which is contoured to effect camming motion of the lever link 70 with respect to the cam foot 100. Cam foot 100 may move from a position as shown in FIG. 5 to a position overlying the fulcrum of lever link 70 as seen in FIG. 4 in a manner to be made hereinafter more apparent. The operating handle 17 and its associated cam foot 100, in the illustrated embodiment of the invention, is normally biased to a non-circuit making position as shown in FIGS. 3 and 5 by arranging a coil spring 102 within journal 101 with an ear 103 of the coil spring anchored with respect to the housing, and then an ear 104 on the opposed end of the coil spring 102 anchored with respect to the journal 101 so that the spring will be in its partially relaxed position when the handle 17 is in the orientation as illustrated in FIG. 5, and upon movement of handle 17 to the position illustrated in FIG. 4 the spring 102 will be wound thereby, tending to bias the handle to the position illustrated in FIG. 5.

A fire wall 110 is formed in the casing between contacts 33 and 35 and the operating handle 17 to prevent any arcing produced on contact separation from being emitted through the handle opening in the casing. The fire wall 110 as seen in FIGS. 4 and 5 is formed of the same non-conducting material as the casing and is formed integral therewith as an extension of partition wall 95. A vent may be provided, as is conventional, to provide relief for arc gases.

In the embodiment of the invention illustrated in FIGS. 13 and 14, the need for handle return spring 103 employed in the FIG. 4 embodiment has been eliminated. This is accomplished by forming a handle return projection 130 on slide member 85 as best seen in FIG. 14. The upper end of projection 130 is formed with a cam end 131 adapted to contact the cam foot 100 which as illustrated is contoured to insure that it lies in the path of cam foot 100 when the handle 17 is moved to place the breaker components in a circuit making orientation.

*Operation*

In use, the aforedescribed novel circuit breaker 10 is employed in conventional fashion by arranging same in a load center panel box with a busbar blade of the panel box engaging spring clip connector 16, and a conductor of the circuit, protected by the circuit breaker, attached beneath screw 22 of wire connector 20.

To close the circuit, the operating handle 17 is moved to the right as illustrated in FIG. 4 causing cam foot 100 to ride over the surface of resilient leg 72 of lever link 70. It will be noted that resilient leg 72 is contoured so that at the commencement of motion of cam 100 over the surface of leg 72, the movement of the cam 100 is implemented by the downward inclination of the surface of leg 72, while at the end of movement of the cam 100 an inclined plane is provided implementing the facility with which the end of the cam 100 may ride up to the fulcrum point of the lever link. As the cam foot 100 moves with respect to the lever link 70, the lever link is forced downwardly displacing the fulcrum in fulcrum slides 79 and simultaneously displacing all components of the lever link so that prong 75 moves downwardly against armature tube 40, insuring orientation of the armature tube in its downward position as shown in FIGS. 4 and 5. Simultaneously with the downward movement of prong 75, foot 73 bears against tongue 90 of slide member 85, the lower end of which bears against contact spring 30 forcing movable contact 33 into circuit making relationship with respect to fixed contact 35.

In FIG. 6 it will be seen that the foot 73 of lever link 70 is narrower than the main body of the link. In FIG. 8 the two inbent sides 87 and 88 of the slide are close to the edges of tongue 90. Thus foot 73 can enter between sides 87 and 88 but the relatively wider leg 71 cannot. Thus when the cam foot 100 presses on portion 72 of lever link 70 it biases foot 73 in over tongue 90, but leg 71 stops the movement inward when it touches 87 and 88. The described action accomplishes two results. First, it insures that the linkage cannot slip as the slide 85 is pressed downward against the strong resistance of contact spring 30, because pressure on arm 72 of lever link 70 tends to rotate it around its fulcrum and biases leg 71 of lever link 70 against faces 87 and 88 of the slide. Secondly, the arrangement insures a fixed horizontal relationship between the lever link and the slide.

The sidewise bias of the lever link 70 against slide 85 must disappear as the contacts close, otherwise the magnetic system would have to provide enough pressure to overcome this bias, in order to trip the breaker. And the breaker must trip when a sustained overload is present, whether or not the handle is held. This is the "trip free of the handle" requirement of Underwriters' Laboratories Inc.

These requirements are met by proper shaping of the cooperating surfaces of cam 100 and the upward rising sloped portion 72 of lever link 70. The action is best shown in FIG. 18. The front end of cam 100 has a smaller radius than its rear end. When the front end of cam 100 reaches the beginning of slope 72a the contacts are still open. They do not close until front end of cam 100 reaches the fulcrum of the lever. At this condition only the front end touches the lever and all sidewise bias imparted to the lever by the handle has disappeared. From this point on until the contacts are fully closed, the point of contact between cam 100 and lever link 70 is only at the fulcrum, because the downward slope of the lever link is greater than the corresponding slope on handle cam 100.

It will be observed that contact spring 30 is so contoured as to provide a downwardly inclined plane at the point of contact of the slide member 85 with the contact spring 30, as best seen in FIG. 4. This downward inclination of the contact spring 30 at its point of contact with slide member 85 coupled with the counterclockwise movement of foot 73 against tongue 90 produced by the movement of cam 100 causes the slide member 85 to move to the left-hand side of the slideway 86 as viewed in FIG. 4.

Once contact has been made between contacts 33 and 35, current will flow through the circuit in which the circuit breaker has been installed, until the handle 17 is manually moved to a circuit breaking orientation as illustrated in FIG. 5 or until an overload condition prevails.

When it is desired to manually break the circuit, as handle 17 is moved to its position shown in FIG. 5, cam 100 moves down the incline 72a and then upwardly towards the top of the case; spring 98 is freed to lift lever link 70 upward, and the bias of contact spring 30 causes slide 85 to rise in its guide slots 86.

As best seen in FIGS. 9–11, leg 71 of lever link 70 and slide member 85 form a toggle having a toggle centerline as labeled on FIG. 9 extending between the fulcrum point of the lever link 70, and the point of contact of the lower end 91 of slide 85 with contact spring 30. This toggle centerline is to the left of a centerline between the axis of the handle journal 101 and the point of contact of the lower end of slide 85. Thus the forces exerted by cam 100 on the lever link fulcrum bias the slide 85 to the left in its slideways. When the point of contact between foot 73 and tongue 90 is to the left of this centerline as seen in FIG. 9, the toggle is locked. When the point of contact between foot 73 and tongue 90 is moved over the toggle centerline, as seen in FIG. 11 a point of maximum sensitivity is attained, and as this point of contact moves to the right of the toggle centerline to the position as illustrated in FIG. 10 foot 73 slips from tongue 90 disengaging lever link 70 from slide 85. The biasing action of spring 30 presses slide 85 all the way up grooves 86, disengaging contacts 33 and 35. Handle spring 103 and lever link spring 98 now function, as previously explained, to move handle 17 to full OFF position and lever link 70 to the top of grooves 79.

When the breaker is to be closed, initial movement of handle cam 100 biases foot 73 into engagement with tongue 90.

In the alternative construction seen in FIGS. 13 and 14 elimination of the necessity for handle spring 103 is obtained.

The spring cavity in the handle is eliminated. The partition wall above the slide is slotted to allow projection 130 to pass through.

After tripping the slide 85 moves upward as before, but as it rises projection 130 strikes the cam surface 100 of the handle and presses it to the right. After this, spring 98 presses the handle cam 100 first downhill then up to the full OFF position.

When the circuit breaker is to be used in its conventional fashion to interrupt the circuit in response to overload conditions, tripping is effected in response to the magnetic field generated by the flow of current through solenoid coil 25. Since under conditions of temporary overload such as on motor start-up, or other temporary overload conditions which are not necessarily dangerous to the circuit being protected, it is undesirable to interrupt the circuit, it is necessary to provide some means to delay the tripping action under these temporary overload conditions. This is accomplished by means of the improved armature tube which is movably mounted with respect to the coil, as best seen in FIG. 7. When the circuit breaker is actuated to complete the circuit, prong 75 on lever link 70 insures positioning of the tube 40 with respect to coil 25 so that under normal current flow through the circuit both the plug 50 and core 45 are displaced from the midpoint of the magnetic field on a centerline transverse to the axis of the coil. The core and plug are relatively heavy and become magnetized under the action of the coil. In response to the magnetic field generated by the coil 25, both the plug and core tend to centralize themselves with respect to this field, and since they are on opposite sides of the centerline of the field they exert forces in opposite directions. An additional magnetic field is provided by virtue of frame 60 which surrounds the coil and becomes magnetized thereby. Core 45 hower, is preferably arranged substantially outside of frame 60 as seen in FIG. 7 while plug 50 is within the frame. Thus on transient overloads, the plug 50, tending to move away from prong 75, and core 45, tending to move toward prong 75, act to neutralize the net pull on the tube 40, and it therefore presses against prong 75 with insufficient force to trip the breaker. If the overload persists, core 45 moves towards plug 50 slowly, since the liquid in the tube must pass through the narrow clearance between core and tube as it moves.

Once core 45 and plug 50 join up, they act as a single core, and are drawn with increasing force toward the upper end of frame 60. In order to show the sequence of actions under sustained overload, the two variable air gaps of FIG. 7 have been labeled A and B and values corresponding closely to an actual magnetic system are given below. There is an air gap labeled B on FIG. 7 between plug 50 and the top arm of frame 60, and there is an air gap A between the plug and the core.

To close gap A requires that the core 50 overcome the bias of spring 47 and the resistance produced by the viscous fluid within the tube. Closing of gap B requires that the tube 40 move prong 75 to displace lever link 70. In the illustrated preferred embodiment of the invention, assuming a gap A of 5/16 of an inch and a gap B of 3/32 of an inch, a pressure required to close gap A of 30 grams and a pressure required to move prong 75 sufficiently to trip the breaker of 70 grams, and maximum pull of which the magnetic system is capable of 150 grams, the characteristic performance curve as shown in FIG. 12 is produced. The requirements of the Underwriters' Laboratories, Inc., to which such breakers must conform if they are to be marketed, specify that a breaker shall not trip at 100% load but must trip at 125% load. Thus in this breaker the core must move very little at 100% load and must develop at least 70 grams pull at 125% load.

As the curve shows, the pull at the start of movement on 125% load is only 10 grams because the core is almost entirely outside the coil. The core moves slowly against spring bias and liquid escape past it until 30 grams of force has been exerted closing gap A, at which time core 45 and plug 50 act as a unitary mass in response to the magnetic field. The 30 gram pressure exerted by the core in moving towards the plug 50 is transmitted to the resilient leg 72 of the lever link 70. Since it requires 70 grams to trip the breaker, prong 75 only yields the amount allowed by the resilience of lever link arm 72. As a result of this resilience, as seen in FIG. 12, air gap B is reduced, and the pull between the end of plug 50 and the upper arm of frame 60 increases inversely as the square of the air gap length so that the curve steepens rapidly as illustrated until the necessary 70 gram tripping force is reached, at which time lever link 70 is pivoted about its fulcrum to move foot 73 to the right of the toggle centerline as illustrated in FIG. 10 releasing the slide lever and permitting the contacts to be opened under the action of contact spring 30.

Due to the resilience of the lever leg 72, as is observed from the characteristic curve, it will be noted that there is a continuance of magnetic force build-up acting on the combined core and plug to increase the available tripping force.

The cumulative action of the resilient arm allowing the air gap to close, and the closure of the air gap, increasing the pull, builds up to the maximum force required to trip, limited only by the maximum pull the system can deliver. Thus variable friction, or any other factor increasing the "hang on" at the trip point could double the required pull in the example cited and the breaker would still trip. This would not be true except for the resilience of the lever link arm, since stoppage of the movement at any point below maximum would leave air gap B partly open and limit the pull to that value.

The opposing assisting action of the core 45 and plug 50 allow the use of relatively heavy cores, resulting in relatively large tripping forces. Because these parts are located in the highest density magnetic field, i.e. within the helical coil, they produce the maximum pull the coil can deliver.

The tripping force is further augmented by the fact that magnetic frame 60 has only one fixed air gap, at 61, where tube 40 passes through. As explained, air gaps A and B close during operation, resulting in a highly efficient magnetic circuit.

This relatively powerful magnetic system along with the resilient lever link 70, make it feasible to use a substantially 1 to 1 ratio of length in the two arms of lever link 70. Any movement and any pressure at prong 75 will be duplicated at foot 73. There is no necessity for high accuracy in lever link 70 or slide 85, except in foot 73 and tongue 90, both of which are easily adjustable.

When the magnetic system described is used in an alternating current circuit breaker, the use of a lever link with a resilient spring section assists the tripping action by imparting a series of hammerlike blows to the link train trip point.

If the initial push fails to trip the link train, the high and low magnetic pulls produced as the current goes through its cycle alternately build up and relieve the pressure on the spring section. The spring gives, then backs up, imparting a vibratory high frequency hammer action on the trip point. This yields a trifle at each blow until it trips. Thus if the breaker in the curve above failed to trip at its maximum pressure of 150 grams, the hammer action described could still make it let go after a series of vibrations.

It will be noted that the lever link is so formed as to provide a bearing for biasing spring 98, and that the relatively moving parts cam 100, resilient leg 72, foot 73, tongue 90, bearing 91 and contact spring 30 touch at only a line of contact, which line is moving, with a resulting self-cleaning action, and the elimination of need for precise pivot bearings as conventionally encountered in circuit breakers.

The action of the slide member 85 in both sliding with respect to slot 86 and rocking with respect to its contact points during tripping and setting serves to minimize friction during tripping and setting. Thus it will be noted that upon the initiation of the tripping action, the counterclockwise movement of lever link 70 about its fulcrum produces a lateral bias (to the right as viewed in FIG. 9) on slide 85. This lateral bias rocks slide 85 about its lower contact point 91 with respect to contact spring 30 which rocking action produces far less friction than the conventional sliding friction which would be encountered if foot 73 had to slide over tongue 90. Once the slide 85 has been rocked to a position at which the point of contact between the foot 73 and the tongue 90 is to the right of the toggle centerline, it will be understood that tripping automatically takes place and friction between the tongue 90 and foot 73 is no longer a problem.

Grooves 79 and 86 in the case need not be of high accuracy. They can vary within commercial tolerances and still not appreciably affect the operation of the breaker. Groove 86 slopes to the left to provide a proper clearance for foot 73 as it rises along the face of slide 85 after tripping.

The assembly of the circuit breaker herein disclosed is very simple. The subassembly, consisting of clip 16, coil 25, frame 60, tube 40, and spring contact 30 carrying contact 33 is dropped into the cavities and spaces provided for it in one half the case. Wire connector 20 carrying screw 22 and contact 35 is placed in grooves provided for it and slide 85 is placed in its groove. Lever link 70 with its spring 86 is placed in its groove, and handle 17 is added. The other half of the case is placed over these parts and four drive pins or other fastenings are added to complete the assembly.

It is thus seen that an improved simple circuit breaker has been provided of minimal cost, higher factor of surety in operation, and with little need for high accuracy in its various parts; without fixed pivot points in its link train, and with a reduced need for ampere turns in its magnetic system.

The above disclosure has been given by way of illustration and elucidation and not by way of limitation, and it is desired to protect all embodiments of the herein disclosed inventive concept within the scope of the appended claims.

What is claimed is:

1. In a circuit breaker having a fixed contact and a movable contact with said movable contact normally biased to a position out of circuit making relationship with respect to said fixed contact, means for bringing said contacts into circuit making relationship, and a solenoid coil arranged in said circuit with said contacts with the flow of current through said solenoid determining the necessity for breaking the circuit: in combination an armature movably arranged within said solenoid coil acting on said means for bringing said contacts into circuit making relationship, said armature comprising a hermetically sealed nonmagnetic tube; a plug in said tube with a major portion of the plug lying on one side of the midpoint of the magnetic field produced in the solenoid; a core movably mounted in said tube arranged with the major portion of said core on the other side of the midpoint of the magnetic field under normal operating conditions, said plug and said core being formed of magnetically responsive material; means biasing said plug and said core away from each other, said core moving toward said plug in response to the flux produced by the flow of current in said solenoid whereby upon the occurrence of an overload condition said armature will move towards said circuit making means to deactivate same.

2. In a circuit breaker as in claim 1 in which said means biasing said plug and said core away from each other comprises a spring between said plug and said core biasing said plug away from said core.

3. A circuit breaker for interrupting current flow through a circuit upon the occurrence of an undesired overload condition in the circuit, said circuit breaker comprising: a pair of relatively movable contacts in the circuit, making the circuit when in contact, and breaking the circuit when separated; a trip linkage positioned with respect to said contacts to effect the position of said contacts; a solenoid coil in the circuit; an armature tube arranged within said solenoid coil; a magnetically responsive plug and core relatively movable in said armature tube; means biasing said core and plug away from each other in said tube; said armature tube arranged with respect to said solenoid with said plug and said core normally displaced from a longitudinal midpoint of the magnetic field produced by said solenoid, whereby said core and said plug are separated as they are pulled in opposite directions toward the midpoint, but when together are pulled in one direction in response to the flux produced by said solenoid under overload conditions to actuate said trip linkage to separate said contacts.

4. In a circuit breaker as in claim 1 in which said means for bringing said contacts into circuit making relationship comprise: a slide member slidably movable with respect to said movable contact; a bell crank lever having a slidable fulcrum; and a cam member slidable with respect to said bell crank lever to move same to a force transmitting position with respect to said slide member.

5. A circuit breaker as in claim 4, said bell crank lever provided with wings at its fulcrum point; a housing plate having slots within which said wings are slidably accommodated to define a fulcrum for said bell crank lever; said cam moving to a position over said fulcrum to orient said bell crank lever to a force transmitting position with respect to said movable contact.

6. In an electro-magnetic circuit breaker comprising a pair of complementary contacts one of which is movable relative to the other; a nonmagnetic hollow tubular member; a magnetic plug piece arranged within said tubular member; a coil surrounding said tubular member and electrically connected to the movable contact; a magnetic core piece mounted within said tubular member and capable of movement toward said plug piece in response to flux of given magnitude produced by the flow of current through said coil; a manually actuated operating member; a lever link movable in response to the movement of said operating member, said lever link having a fulcrum which is movable in response to the movement of said operating member and about which said lever link is pivotal from a position bringing said pair of complementary contacts into circuit making relationship with respect to each other until flux of a given magnitude is produced by the flow of current through said coil, whereupon said lever link will be pivoted about said fulcrum to permit said contacts to be separated.

7. In a breaker as in claim 6 a contact spring carrying said movable contact and biasing same to a position separated from the other contact; a slide assembly movable in a direction against said contact spring and bearing thereagainst, said slide assembly at one limit of its travel closing said contacts; a foot on said lever link engaging said slide assembly at a point movable to opposite side of a line between said fulcrum and a point of contact of said slide assembly with said contact spring.

8. In a breaker as in claim 6 an input terminal and an output terminal; a movable contact spring extending from said movable contact to one end of said coil, the other end of said coil being connected to said input terminal, said contact spring being tensioned so that the contacts are normally separated, and said lever link being operable to exert a force causing said contact spring to open and close said contacts.

9. An electro-magnetic circuit breaker comprising an input terminal and an output terminal; a solenoid coil having one end connected to said input terminal; a movable contact spring extending from the other end of said coil to a movable contact; a stationary contact connected to said output terminal, said contact spring being tensioned so that the contact carried thereby is normally separated from said fixed contact; a manually movable operating member having a cam surface; a lever link having a portion contacting said cam surface; a movable fulcrum mounting said lever link for pivotal movement, with said cam surface on said operating member movable to a position from one side of said fulcrum to a position over said fulcrum, another portion of said lever link exerting a bias which is transmitted to said contact spring to bring said movable contact into electrically conducting relationship with respect to said stationary contact when said operating member has been moved to move said cam surface to a position from which it initially contacted said lever link to a position over said fulcrum.

10. A breaker as in claim 9 wherein: a slide member is interposed between said contact spring and said lever link, said slide member movable against said contact spring to force same into electrically conducting relationship with respect to said stationary contact and engaging said lever link at a point which when on one side of a toggle centerline extending through said fulcrum and a point of contact of said slide member and said contact spring locks said contacts in circuit making relationship, and when on another side of the toggle centerline permits the contact spring to separate said contacts.

11. A breaker as in claim 10 in which said lever link has a spring portion in a section thereof; means effected by the flux produced in said coil when current flows therethrough, said means contacting said lever link to exert a distorting force on said spring portion thereof.

12. An electro-magnetic circuit breaker comprising in combination: an insulator casing separable into two parts; an input end comprising a spring clip adapted to engage a blade contact; an output end comprising a wire connector; an interruptable electrical circuit connecting said spring clip to said wire connector comprising a solenoid coil having one end connected to said spring clip a movable spring contact connected to the other end of said solenoid coil, said contact spring being tensioned so that said contacts are normally separated, and when said contacts are closed, the circuit is completed from the input end to the output end; a mechanism for controlling manually and automatically the movement of said movable contact comprising a solenoid armature movably mounted in said casing and having a magnetic corepiece movable within said coil in response to the flow of current through said coil; a bell crank shaped lever link fulcrumed in said casing, having one end arranged in the line of travel of said corepiece, and the other end movable in a direction to bias said contact spring to bring said contacts into current conducting relationship; a fulcrum slideway formed in said casing defining a path of movement for the fulcrum of said lever link, the upper biasing of said contact spring exerting a force on said lever link on one side of its fulcrum; and an operating member movable against said lever link from a position on a side of the fulcrum corresponding to the side on which said aforementioned force exerted by the said contact spring is exerted to a point over the fulcrum whereby said operating member may be moved to a position urging said contact spring and movable contact into engagement with said fixed contact until a flux of given magnitude is produced whereupon said movable corepiece will exert a force on said lever spring upsetting the balance of forces previously obtaining between the force exerted by said operating member and the force exerted by said contact spring on said lever link to trip same.

13. In a circuit breaker: a stationary contact member; a movable contact member biased away from said stationary contact member; a resilient member, said resilient member being movable from a first stable position to a second unstable position; cam means urging said resilient member in its first position towards said movable contact member placing and holding the movable contact member in abutment with the stationary contact member; wall structure defining grooves, said resilient member having portions slidably movable in said grooves; tripping means initiating the movement of said resilient member out of said second unstable position, the bias of said movable contact member completing the movement of said resilient member out of said unstable position while the movable contact member moves away from said stationary contact member, said tripping means including a slidable armature and a solenoid coil capable of attracting said armature upon the occurrence of an over current; said slidable armature comprising a plug and a core, the end of said plug engageable with said resilient member upon movement of said core towards said plug.

14. A circuit breaker comprising: a stationary contact and a movable contact, the latter mounted on a spring arm; a bell crank lever having an elongated resilient arm; cam means urging said bell crank lever towards said spring arm to move the movable contact into abutment with the stationary contact; wall structure defining grooves, said bell crank member having portions slidable in said grooves to fulcrum same; tripping means comprising a slidable armature and a solenoid, said slidable armature being so constructed that upon the occurrence of a predetermined overload of current one end of said armature will press against said resilient arm whereby said bell crank lever will be moved out of a force applying position with respect to said movable contact to permit movement of the movable contact under the bias of the spring arm.

15. In a circuit breaker: a stationary contact member; a movable contact member biased away from said stationary contact member; resilient means mounted for movement with respect to said stationary contact member; cam means urging said resilient means towards said movable contact member, said cam means being slidable with respect to said resilient means, said movable contact member being slidable with respect to said resilient means; wall structure limiting the movement of said resilient means between said cam means and said contact member, said resilient means being slidably connected to said wall structure, said cam being movable to positions corresponding to the open and closed positions of the contacts, said resilient means being movable in response to said cam from a first stable position to a second unstable position, said cam and said contacts each moving simultaneously to the open position of the contacts during movement of the resilient means to a position not urging the contacts into a closed position.

16. In a circuit breaker: a stationary contact member; a movable contact member; a first link pivotal with respect to said contacts; a second link slidable with respect to said contacts; a wall structure limiting the movement of said slide member in a direction transverse to its longitudinal axis and the direction transverse to that of the force transmitting direction, said link structure being slidable upon said wall structure operating means biasing said links to a force transmitting position and simultaneously urging same towards said movable contact member, said operating means being slidably connected to one of said links, said movable contact member being slidably connected to the other of said links, said movable contact member being biased to the contacts open position; trip means pivoting one of said links relative to the other to a position out of said force transmitting position.

17. In a circuit breaker: a casing; a stationary contact member in said casing; a movable contact member mounted in said casing for movement to and away from said stationary contact member; a first link pivotally mounted in said casing with respect to said contact members; a second link slidable in said casing with respect to said contact members and in engagement with said movable contact member; an operating member movable against at least one of said links and biasing said links to a force transmitting position simultaneously urging same towards said movable contact member, said movable contact member being biased to a contacts open position; trip means in said casing acting on said links to move same to a non force transmitting position; and a projection on one of said links acting on said operating member to return same to a non biasing position when said links are tripped.

References Cited
UNITED STATES PATENTS

| | | | |
|---|---|---|---|
| 2,769,058 | 10/1956 | Wallace et al. | 200—103 X |
| 2,890,306 | 6/1959 | Rypinski et al. | 200—88 X |
| 3,016,435 | 1/1962 | Schwartz | 200—87 X |

BERNARD A. GILHEANY, *Primary Examiner.*

T. MACBLAIN, R. N. ENVALL, JR.,
*Assistant Examiners.*